(12) United States Patent
Thomae

(10) Patent No.: US 11,841,683 B2
(45) Date of Patent: Dec. 12, 2023

(54) ILLUMINATION DEVICE FOR VEHICLES

(71) Applicant: Carl Zeiss Jena GmbH, Jena (DE)

(72) Inventor: Daniel Thomae, Jena (DE)

(73) Assignee: Carl Zeiss Jena GmbH, Jena (DE)

( * ) Notice: Subject to any disclaimer, the term of this patent is extended or adjusted under 35 U.S.C. 154(b) by 422 days.

(21) Appl. No.: 17/260,051

(22) PCT Filed: Jul. 4, 2019

(86) PCT No.: PCT/EP2019/067965
§ 371 (c)(1),
(2) Date: Jan. 13, 2021

(87) PCT Pub. No.: WO2020/011636
PCT Pub. Date: Jan. 16, 2020

(65) Prior Publication Data
US 2021/0278803 A1    Sep. 9, 2021

(30) Foreign Application Priority Data
Jul. 13, 2018   (DE) ..................... 10 2018 117 001.7

(51) Int. Cl.
G03H 1/02      (2006.01)
G03H 1/22      (2006.01)

(52) U.S. Cl.
CPC ......... *G03H 1/0248* (2013.01); *G03H 1/2286* (2013.01); *G03H 2222/12* (2013.01); *G03H 2240/53* (2013.01); *G03H 2240/55* (2013.01)

(58) Field of Classification Search
None
See application file for complete search history.

(56) References Cited

U.S. PATENT DOCUMENTS

| | | | |
|---|---|---|---|
| 4,711,512 A | 12/1987 | Upatnicks | |
| 5,101,193 A | 3/1992 | Smith et al. | |
| 5,106,174 A | 4/1992 | Smith | |
| 5,135,751 A | 8/1992 | Henry et al. | |
| 5,341,230 A | 8/1994 | Smith | |
| 5,347,435 A | 9/1994 | Smith et al. | |
| 5,634,708 A | 6/1997 | Koie et al. | |
| 5,711,592 A | 1/1998 | Yoshihiko | |
| 5,745,266 A | 4/1998 | Smith | |
| 6,062,710 A | 5/2000 | Hewitt | |

(Continued)

FOREIGN PATENT DOCUMENTS

| | | |
|---|---|---|
| CN | 104777535 A | 5/2017 |
| DE | 69311704 T2 | 10/1997 |

(Continued)

OTHER PUBLICATIONS

Office Action dated Aug. 2, 2021 from corresponding Chinese Patent Appl. No. 201980046698.1.

(Continued)

*Primary Examiner* — Jennifer D. Carruth
(74) *Attorney, Agent, or Firm* — KUSNER & JAFFE

(57) ABSTRACT

A hologram for an illumination device for vehicles and a corresponding illumination device are provided. The hologram has a plurality of holographic structures designed for a respectively associated wavelength, wherein the holographic structures have diffraction properties that are identical among one another.

21 Claims, 5 Drawing Sheets

(56) References Cited

U.S. PATENT DOCUMENTS

| | | | |
|---|---|---|---|
| 10,414,333 B2 | 9/2019 | Muegge | |
| 2002/0135830 A1 | 9/2002 | Endo | |
| 2005/0201120 A1 | 9/2005 | Nesterenko et al. | |
| 2006/0002101 A1 | 1/2006 | Wheatley | |
| 2006/0203486 A1 | 9/2006 | Lee | |
| 2011/0194163 A1 | 8/2011 | Shimizu | |
| 2012/0002197 A1 | 1/2012 | Havermeyer | |
| 2012/0092735 A1* | 4/2012 | Futterer | G02B 27/126 359/11 |
| 2013/0016410 A1 | 1/2013 | Futterer | |
| 2014/0092321 A1 | 4/2014 | Kurashige | |
| 2014/0268867 A1 | 9/2014 | Marco et al. | |
| 2015/0124303 A1 | 5/2015 | Dimov et al. | |
| 2015/0220058 A1 | 8/2015 | Mukhtarov et al. | |
| 2017/0059759 A1 | 3/2017 | Anderson | |
| 2017/0090096 A1 | 3/2017 | Fattal | |
| 2018/0058656 A1 | 3/2018 | Naron | |
| 2018/0074457 A1 | 3/2018 | Jolly et al. | |
| 2018/0239096 A1 | 8/2018 | Houbertz et al. | |
| 2019/0129360 A1 | 5/2019 | Karthaus | |
| 2019/0351814 A1 | 11/2019 | Furubayashi | |
| 2020/0057308 A1* | 2/2020 | Choi | G02B 27/0101 |
| 2020/0409305 A1 | 12/2020 | Erler | |

FOREIGN PATENT DOCUMENTS

| | | |
|---|---|---|
| DE | 102011079127 A1 | 1/2013 |
| DE | 202014003241 U1 | 8/2015 |
| DE | 102014223933 A1 | 5/2016 |
| DE | 102014117842 A1 | 6/2016 |
| DE | 102016107307 A1 | 10/2017 |
| DE | 102016117557 A1 | 3/2018 |
| DE | 102016117969 A1 | 3/2018 |
| DE | 102018116670 A1 | 1/2020 |
| EP | 0407773 A2 | 1/1991 |
| EP | 0452815 A1 | 10/1991 |
| GB | 2540474 A | 1/2017 |
| JP | H03-121942 A | 5/1991 |
| JP | H06 230225 A | 8/1994 |
| JP | H07 192510 A | 7/1995 |
| JP | 2001074894 A | 3/2001 |
| WO | WO1998/025169 A1 | 6/1998 |
| WO | WO 2018/054985 A1 | 3/2018 |

OTHER PUBLICATIONS

International Search Report from corresponding International Patent Application No. PCT/EP19/67965, dated Sep. 25, 2019.
Peercy M S et al: "Wavelength selection for true-color holography", Applied Optics, Optical Society of America, Washington, DC; US, Bd. 33, Nr. 29, Oct. 10, 1994.
Philippe Gentet et al: "New LED's wavelengths improve drastically the quality of illumination of pulsed digital holograms", Digital Holography and Three-Dimensional Imaging, Jan. 1, 2017.
International Search Report from related International Patent Application No. PCT/EP19/67122, dated Oct. 18, 2019.
International Search Report from related International Patent Application No. PCT/EP18/78420, dated Dec. 6, 2018.

* cited by examiner

ILLUMINATION DEVICE FOR VEHICLES

FIELD OF THE INVENTION

The present application relates to illumination devices for vehicles, in particular illumination devices that can be used as signal lamps such as indicator lamps (flashing indicators) or brake lamps or as rear lamps (tail lamp).

BACKGROUND OF THE INVENTION

Illumination devices are used in vehicles firstly in order to illuminate the environment of the vehicle to enable visibility for a driver of the vehicle even in the dark, and secondly to make other persons or vehicles aware of the vehicle equipped with the illumination device. Examples of such illumination devices are front headlamps, rear lamps, brake lamps or indicator lamps.

Besides their technical function, such illumination devices are increasingly also being used to give vehicles of a specific brand a distinctive appearance, for example. In this case, principally the outer shape of such illumination devices has initially been used as a design feature. The luminous signature of such illumination devices is increasingly also being configured in a characteristic fashion, i.e. the "appearance" of the light is used as a design feature. By way of example, characteristic luminous signatures are used in vehicle tail lamps.

The German patent application DE 10 2016 117 969 A1 in the name of the applicant describes apparatuses in which holograms, in particular volume holograms, can be used to produce luminous signatures. That application describes the use both of reflection holograms and also of transmission holograms. In transmission holograms, the hologram is illuminated from one half-space of the hologram (i.e. from one side of the hologram), while it is observed from the other half-space (from the other side of the hologram). In reflection holograms, by contrast, the illumination takes place from the same side as the observation. This can be difficult to realize if there is little structural space available, particularly if the hologram has to be arranged near the exterior of the vehicle. On the other hand, reflection holograms have the advantage that they generally operate more wavelength-selectively than transmission holograms, i.e. only light of a narrow wavelength range is imaged as a luminous signature depending on thickness, as will be explained later.

In this respect, the German patent application 10 2017 124 296.1 in the name of the applicant describes an arrangement comprising a light guiding body that enables a compact arrangement even in the case of reflection holograms.

In such illumination devices, an object corresponding to a desired luminous signature is "written" into a hologram. Upon illumination with a so-called illumination light beam, said object then appears as a real or virtual holographic object, which represents as it were the real or virtual image of the hologram. This procedure is illustrated schematically in FIG. 1.

FIG. 1 shows a holographic layer 11 that is illuminated with an illumination light beam 10. Bragg planes 13 are essentially written into the hologram, four of said Bragg planes 13 being illustrated for elucidation purposes in FIG. 1. Said Bragg planes have a distance D. The Bragg planes 13 diffract the illumination light beam 10 to form object light beams 15. For this purpose, a small portion of the illumination light beam 10 is reflected at each Bragg plane 13, and the direction of the object light beams 15 then results from constructive interference of this plurality of reflected waves.

For this purpose, the Bragg planes 13 must have a distance D which is adapted to the wavelength to be diffracted, and for a reflection hologram is a minimum of half the wavelength in the material, which for a wavelength of, for example, 633 nm (in the red range, for example for tail lamps) and the refractive index n=1.5 yields a Bragg plane distance D equal to 211 nm. In this case, 633 nm corresponds to a helium-neon laser wavelength which can be used for recording the hologram, for example. In the example in FIG. 1, said object light beams 15 are parallel to a normal 12 to an interface 14 of the holographic layer 11. The interface 14 can be for example an interface with a light guiding body, as described in the German patent application 10 2017 124 269.1 cited, or an interface with air, depending on the implementation of the illumination device.

It should be noted that the illustration of a single group of Bragg planes 13 should be understood to be merely schematic and applies locally to one image point of the holographic object generated. For any other image point of the holographic object, the Bragg planes have a different inclination. In the case of an extensive holographic object, i.e. an object consisting not just of a single image point, as is the subject matter of the present application, a plurality of groups of Bragg planes of different inclinations are thus superimposed in order to produce a plurality of image points of the holographic object.

As a numerical example it is assumed that the holographic layer 11 has a refractive index of 1.5 and the illumination light beam 10 impinges on the holographic layer 11 at an angle of 70 degrees (measured with respect to the surface normal 12, as usual in optics). Refraction effects at the interface 14 are disregarded, which is applicable if the refractive index of the material of the surroundings substantially corresponds to that of the holographic layer 11.

Otherwise refraction effects that cause the angle to change can also be taken into account in a simple manner by way of geometric considerations.

As already explained, such holographic layers are wavelength-selective, i.e. the Bragg plane distance D is adapted to diffract light of a specific wavelength. However, light of adjacent wavelengths is still diffracted to a certain degree. How "sharp" the wavelength selectivity is here also depends on the thickness of the holographic layer 11 and the associated number of Bragg planes 13. This will now be illustrated with reference to FIGS. 2A to 2C.

FIGS. 2A to 2C in each case show the diffraction efficiency $\eta$ in percent against the wavelength $\lambda$ in nanometers of the illumination light beam 10. Here FIG. 2A shows an example for a hologram thickness of 2.5 µm, FIG. 2B shows an example for a hologram thickness of 25 µm and FIG. 2C shows an example for a hologram thickness of 250 µm. The holograms were configured here for all thicknesses such that the peak efficiency is 0.1% at 633 nm, i.e. 0.1% of the incident illumination light beam 10 is diffracted in the region of the hologram under consideration to form the object light beam 15. In the case of the arrangement in the German patent application 10 2017 124 296.1, for example, the rest of the illumination light beam 10 is reflected in a light guiding body and guided to other locations of the holographic layer 11, such that the holographic layer 11 is illuminated overall and object light beams 15 are emitted over a larger area. Achieving this identical peak efficiency of 0.1% necessitates different modulations $\Delta n$ of the refractive index depending on the hologram thickness, i.e. changes in refractive index, in order to form the Bragg planes 13. In this regard, for a hologram thickness of 2.5 µm (FIG. 2A) $\Delta n=1.49 \cdot 10^{-3}$, for a hologram thickness of 25 µm Δn=1.49·10⁻⁴, and for a hologram thickness of 250 μm Δn=1.49·10⁻⁵. The Δn required for attaining a specific peak efficiency thus increases as the hologram thickness decreases. The Δn "reserve", i.e. the refractive index variation that is implementable overall in a hologram, is finite here and must be "distributed" as it were among all virtual image points of the holographic image to be generated.

As can be seen in FIGS. 2A to 2C, for a thinner hologram a wider distribution of the diffraction efficiency arises, which becomes narrower as the hologram thickness increases. In other words, in the case of thinner holograms, wavelengths adjacent to the wavelength of 633 nm are also diffracted in a wider range. In this regard, the diffraction efficiency falls to 0.05% (50% of the maximum value of 0.1%) at 597 nm and 695.7 nm in the case of FIG. 2A, at 629.5 nm and 636.5 nm in the case of FIG. 2B, and at 632.64 nm and 633.36 nm in the case of FIG. 2C.

In the automotive sector, in particular, light emitting diodes are preferably used as light sources for generating the illumination light beam 10. Such light emitting diodes have a certain spectral width. One example of such a spectral distribution of typical light emitting diodes is indicated by curves 20 in FIGS. 2A to 2C.

This has the effect that in the case of FIG. 2C with high wavelength selectivity, only a very small portion of the intensity of the light emitting diode is diffracted, which results in an image with comparatively little light intensity. In the case of illumination devices for vehicles, this may be undesirable or necessitate correspondingly intense illumination, with a large portion of the light then remaining unused.

In the case of FIG. 2A, by contrast, a larger portion of the available spectrum is used owing to the wider distribution of the diffraction efficiency η(λ). However, although a larger portion of the spectrum is diffracted, the diffraction angle is wavelength-dependent. In other words, only the wavelength λ=633 nm in the example in FIGS. 2A to 2C is diffracted exactly in the desired direction (for example parallel to the surface normal 12 in FIG. 1), while adjacent wavelengths are diffracted at slightly deviating angles. This will now be explained in somewhat more specific detail: The interaction mechanism with which the light incident on the hologram is deflected is diffraction. The diffraction angles that result after the light interaction can be calculated by way of the grating equation:

$$n' \cdot \sin(a') = n \cdot \sin(a_{in}) + m \cdot \lambda/p$$

In this case, n is the refractive index for the incident beam, n' is the refractive index for the emergent/diffracted beam, ain is the angle of incidence, a' is the emergent or diffraction angle, λ is the wavelength, m is the order (this is generally −1 or +1 in the case of volume gratings) and p is the grating period.

For the object light beam 15, in the example in FIG. 1, a deflection takes place from the angle of incidence of 70° of the illumination light beam 10 to 0° as emergent or diffraction angle (in reflection). With the assumptions made above concerning refractive indices and wavelength, the grating period is thus calculated as:

$$p = \frac{m \cdot \lambda}{n \cdot (-\sin(La_{in}) - \sin a')} = 449.083 \text{ nm}$$

For the further calculation, a light emitting diode (LED) having a central wavelength of 633 nm is assumed, the emission spectrum of which is configured according to the curves 20 such that its emitted power decreases to 50% for 623 nm and for 643 nm. The decrease criterion thus corresponds to that which was used above for the hologram efficiency.

For assessing the visibility of the radiation, it is assumed for simplification that a virtual luminous spot of the generated virtual object from which the object light beams 15 are apparently emitted is no longer visible if the power emitted toward the exterior of the vehicle falls below 50% of the maximum emitted power. This is an artificially chosen and very optimistic assumption since the human eye, as a logarithmic detector, still reacts sensitively even to small amounts of residual light. Likewise, the spectral sensitivity curve of the human eye is also disregarded for reasons of simplicity.

For the three hologram thicknesses chosen above of 2.5, 25 and 250 μm, it is then possible to estimate the spectral wavelength band which is reflected to the observer:

2.5 μm hologram thickness (FIG. 2A): The sinc²-shaped efficiency curve of the hologram is significantly wider than the emission curve of the LED, such that the 50% limit wavelength is substantially dominated by the LED. The 50% limit wavelengths of the LED of 623 nm and 643 nm can thus be assumed as a good estimate.

25 μm hologram thickness (FIG. 2B): The sinc²-shaped curve of the hologram is dominant here, such that the spectral width of the LED plays almost no part. The 50% limit wavelengths are thus approximately 629.5 and 636.5 nm.

The same applies to the 250 μm thick hologram, where the 50% limit wavelengths are determined by the hologram function and are 632.64 nm and 633.36 nm.

As already mentioned, however, the deflection angle of the hologram is also wavelength-dependent in accordance with the grating equation. For the angle of the object light beam 15 for the 50% limit wavelengths, the following values are obtained depending on the hologram thickness:

2.5 μm hologram thickness: +0.851° for 623 nm and −0.851° for 643 nm

25 μm hologram thickness: +0.298° for 629.5 nm and −0.298° for 636.5 nm

250 μm hologram thickness: +0.031° for 632.64 nm and −0.031 for 633.36 nm

A hologram reproduces the written image as a virtual object, such that it appears to the observer as if the object were really present behind the hologram or in front of the hologram, for example. Strictly speaking, this applies only to the recording wavelength of the hologram, 633 nm in the above example.

However, all the limit wavelengths mentioned above are still close enough to the recording wavelength of 633 nm, such that the distortion of the virtual image as a result of the deviation from the recording wavelength can be disregarded without a great loss of accuracy. With this approximation, the deflection angles thus calculated and the distance—chosen as an example—of the virtual image point of the—in this case virtual—holographic object of 32 cm behind the hologram, it is possible to calculate the spectrally occurring shift of virtual image points of the virtual object. The shift takes place upward or downward in the illustration in FIG. 1 and is indicated here as distance from the target position at the wavelength of 633 nm. Shifts upward are positive, and those downward are negative.

For the hologram thicknesses under consideration, the following thus arise as shift:

2.5 μm hologram thickness: +4.8 mm for 623 nm and −4.8 mm for 643 nm

25 μm hologram thickness: +1.7 mm for 629.5 nm and −1.7 mm for 636.5 nm

250 μm hologram thickness: +0.2 mm for 632.64 nm and −0.2 mm for 633.36 nm.

For an observer this means in practice that a very thin line running e.g. horizontally in the image (i.e. perpendicularly to the plane of the drawing in FIG. 1) is widened to 1 cm in the case of a 2.5 μm thick hologram. In reality this effect is much more highly pronounced since the human eye, as a logarithmic detector, is able to capture the luminous signal provided by the hologram even at only 1% or 0.1% of the maximum intensity. The consideration with the 50% decrease therefore serves only for elucidation, but does not reproduce the physiological perception process.

Consequently, in the case of thin holograms, in particular, fine structures of the virtual object are widened, such that the virtual object is possibly not perceived as intended, but rather blurred to a greater or lesser extent. On the other hand, as explained above, in the case of thick holograms, as in FIG. 2C, that proportion of the light of the illumination beam 10 which is actually used in the case of comparatively broadband illumination such as by light emitting diodes is very small, which is likewise undesirable.

SUMMARY OF THE INVENTION

It is therefore an object of the present invention to provide holograms for illumination devices for vehicles and corresponding illumination devices with which, firstly, a reproduction even of comparatively fine structures is ensured and, secondly, an improved utilization of the illumination light is afforded.

This object is achieved by means of a hologram for an illumination device for vehicles as claimed in claim 1. The dependent claims define further embodiments of the hologram and also an illumination device for vehicles with a corresponding hologram.

The invention provides a hologram for an illumination device for vehicles, comprising a plurality of superimposed holographic structures, wherein each of the plurality of holographic structures for a respectively associated reconstruction wavelength has the same diffraction directions for the reconstruction of an extensive holographic object (in particular one diffraction direction for each image point of the holographic object), wherein the associated reconstruction wavelengths are different. As already explained, an extensive holographic object is an object that does not just consist of one image point, but rather has a spatial extent. The reconstruction wavelength here is that wavelength of the light with which the hologram is illuminated for the reconstruction of the holographic object.

By providing the plurality of holographic structures for different reconstruction wavelengths, it is possible here for an illumination light beam to be better utilized overall.

Each of the plurality of superimposed holographic structures for an, in particular each, image point of the holographic object locally can have an associated group of Bragg planes, wherein the Bragg planes of groups of different structures that are associated with an image point of the holographic object are locally parallel to one another and have distances between the Bragg planes that correspond to the wavelengths associated with the respective structure. The same diffraction direction for the respective reconstruction wavelengths is achieved by means of the parallel Bragg planes with different Bragg plane distances. The reconstruction wavelength here is that wavelength for which the respective group has the maximum diffraction efficiency.

A thickness of an active layer of the hologram can be greater than 50 μm, in particular greater than or equal to 140 μm or even greater, e.g. greater than 200 μm or greater than 250 μm.

Such hologram thicknesses are associated with a high wavelength selectivity, which reduces a widening of structures in a virtual object generated by illumination of the hologram.

At least three of the reconstruction wavelengths can lie in a wavelength interval of 50 nm, in particular 25 nm, that is to say substantially within or somewhat outside the spectral range of a typical light source, such as a light emitting diode, in order that the spectrum of the light source is utilized well.

The plurality of superimposed holographic structures can comprise more than three, in particular more than five, holographic structures. A greater utilization of the spectrum of a light source can be achieved by means of a greater number of structures with differently associated reconstruction wavelengths in each case.

Furthermore, an illumination device for motor vehicles is provided, comprising:

a light source arrangement for generating an illumination light beam, a hologram as described above, and an optical arrangement for directing the illumination light beam onto the hologram.

The associated reconstruction wavelengths can be distributed over a spectral range which is greater than a full width at half maximum of a spectrum of the light source arrangement. As a result, a drift of a spectrum of the light source arrangement, e.g. a thermal drift, can be at least partly compensated for.

Values of full width at half maximum for diffraction efficiencies of the hologram associated with the reconstruction wavelengths can overlap at least for some of the wavelengths.

By virtue of the reconstruction wavelengths of the plurality of holographic structures thus lying in a comparatively small range, the spectrum of a light source arrangement typically used, such as a light emitting diode, can be utilized well.

BRIEF DESCRIPTION OF THE DRAWINGS

The invention is explained in greater detail below on the basis of embodiments with reference to the accompanying drawings. In the figures.

DETAILED DESCRIPTION OF THE INVENTION

Various embodiments are explained below with reference to the accompanying drawings. It should be noted that these embodiments serve merely for elucidation and should not be construed as limiting. Moreover, elements of different embodiments can be combined with one another in order to form further embodiments. Variations, modifications and details which are described for components of one of the embodiments are also applicable to corresponding components of other embodiments.

Figure 3:
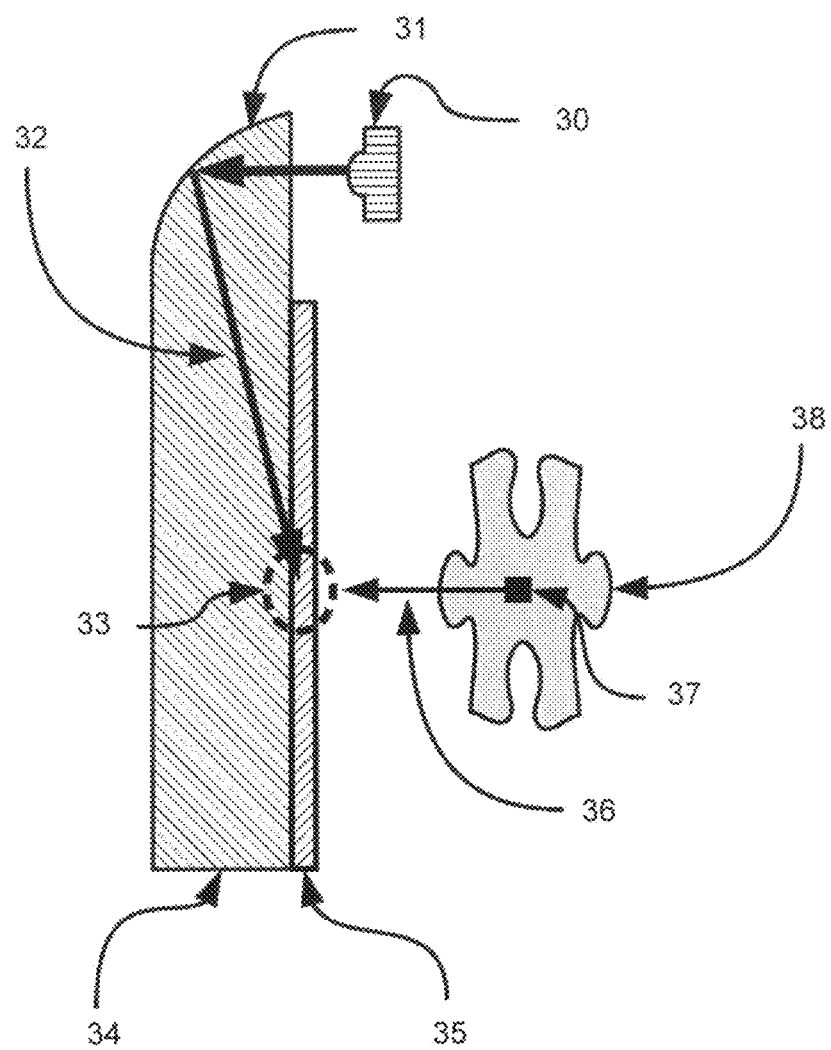
FIG. 3 shows a sectional view of an illumination device in accordance with one embodiment.

FIG. 3 shows a sectional view of an illumination device in accordance with an embodiment.

The illumination device of FIG. 3 comprises a light source arrangement 30, which can have one or more light emitting diodes, for example. If the illumination device in FIG. 3 is a tail lamp, said light emitting diodes can be red light emitting diodes, in particular, i.e. emit in the red spectral range. For other types of illumination devices, light sources which emit in a different part of the spectrum (for example yellow for indicator lamps) or broadband white light (for example for front headlamps) can correspondingly be used. In addition, the illumination device in FIG. 3 has a reflection hologram 35, which, upon illumination by light from the light source arrangement 30, produces a luminous signature, i.e. diffracts or directionally scatters the light in order to reproduce a virtual object stored in the reflection hologram 35, from which virtual object the light then apparently emanates. Said virtual object can in particular lie outside the vehicle in which the illumination device from FIG. 3 is installed, in order thus to bring about the impression of an illumination device outside the vehicle (for example behind the vehicle in the case of a tail lamp).

In this case, the reflection hologram 35 is a reflection hologram according to the invention having holographic structures for a plurality of reconstruction wavelengths (also referred to simply as wavelengths hereinafter). The implementation of such a hologram according to the invention will be explained in greater detail later.

In the case of the embodiment in FIG. 3, beams 32 pass to a beam deflection region 31 of a light guiding body 34. The beams 32 are deflected in the beam deflection region 31 such that they illuminate the reflection hologram 35. The refractive index of the light guiding body 34 here is preferably close to the refractive index of the reflection hologram 35 in order to minimize reflection losses at internal interfaces.

Apart from the use of the hologram 35 according to the invention, the illumination device in FIG. 3 corresponds to an illumination device described in the German patent application 10 2017 124 296.1 cited in the introduction, and will not be described in any further detail. Said illumination device serves as one example for the use of the hologram 35 according to the invention. However, such a hologram according to the invention can also be used in other illumination devices for vehicles, for example other illumination devices described in the German patent application 10 2017 124 296.1, or else illumination devices described in DE 10 2016 117 969 A1 in the name of the applicant, or else other illumination devices for vehicles in which a hologram is illuminated by a light source arrangement.

As explained in the German patent application 10 2017 124 296.1 in the name of the applicant, the beam 32 can also be guided in the light guiding body 34 by multiple reflection at the outer surfaces facing outward, in order thus to illuminate the entire reflection hologram 35, wherein a portion of the light incident on the reflection hologram is in each case diffracted or directionally scattered in order to generate the extensive virtual holographic object (also referred to simply as virtual object for short hereinafter). Locally a region 33 which generates a region 38—illustrated as a jigsaw piece—of the virtual object or else the entire virtual object will be considered for the following explanations. The virtual object has virtual image points 37, virtual beams 36 emanating for each image point. In this case, "virtual" means that for an observer the light beams apparently emanate from the reconstructed virtual object, but in reality are diffracted or directionally scattered toward an observer by the hologram 35 in such a way that the diffracted or scattered beams are superimposed so as to give rise to the impression of the virtual object.

Even though a virtual object is used here as an example of a holographic object, the techniques illustrated here can also be applied to holograms that generate real holographic objects or objects lying in the plane of the hologram.

It should be noted that such holograms that store a virtual holographic object that is then reproduced should be differentiated from holograms that serve to provide an optical function such as a mirror function, for example. In the former case, a virtual, in particular three-dimensional, extensive object having defined dimensions, for example, arises in space, while in the second case the hologram recreates the effect of an optical element, for example of a mirror (plane mirror, parabolic mirror, etc.).

Figure 1:
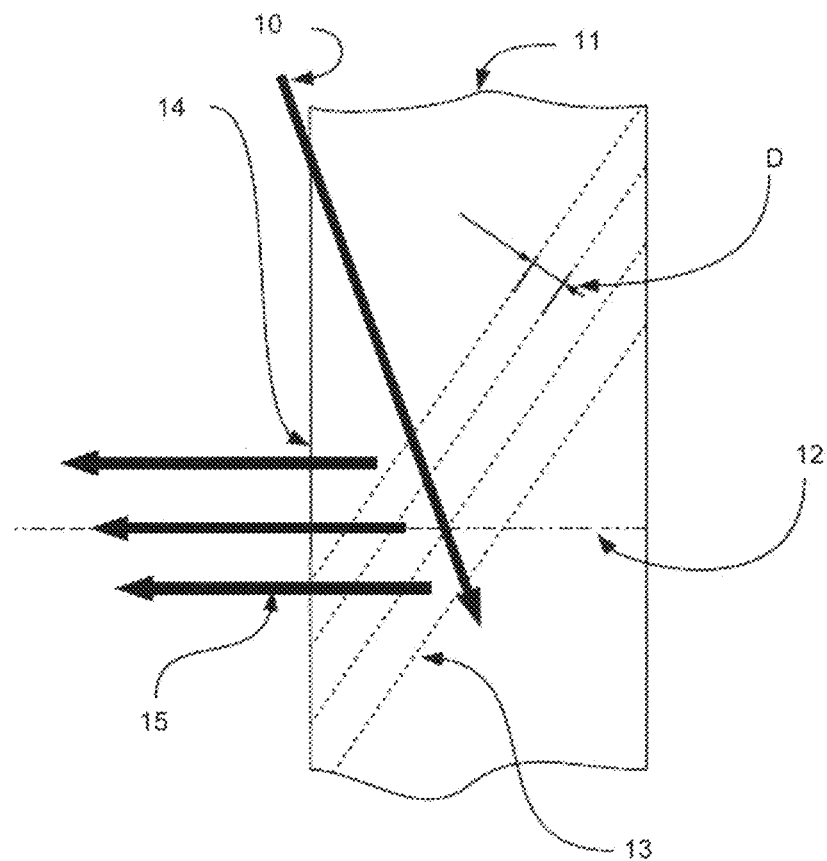
FIG. 1 shows a hologram in accordance with the prior art.
Figure 4:
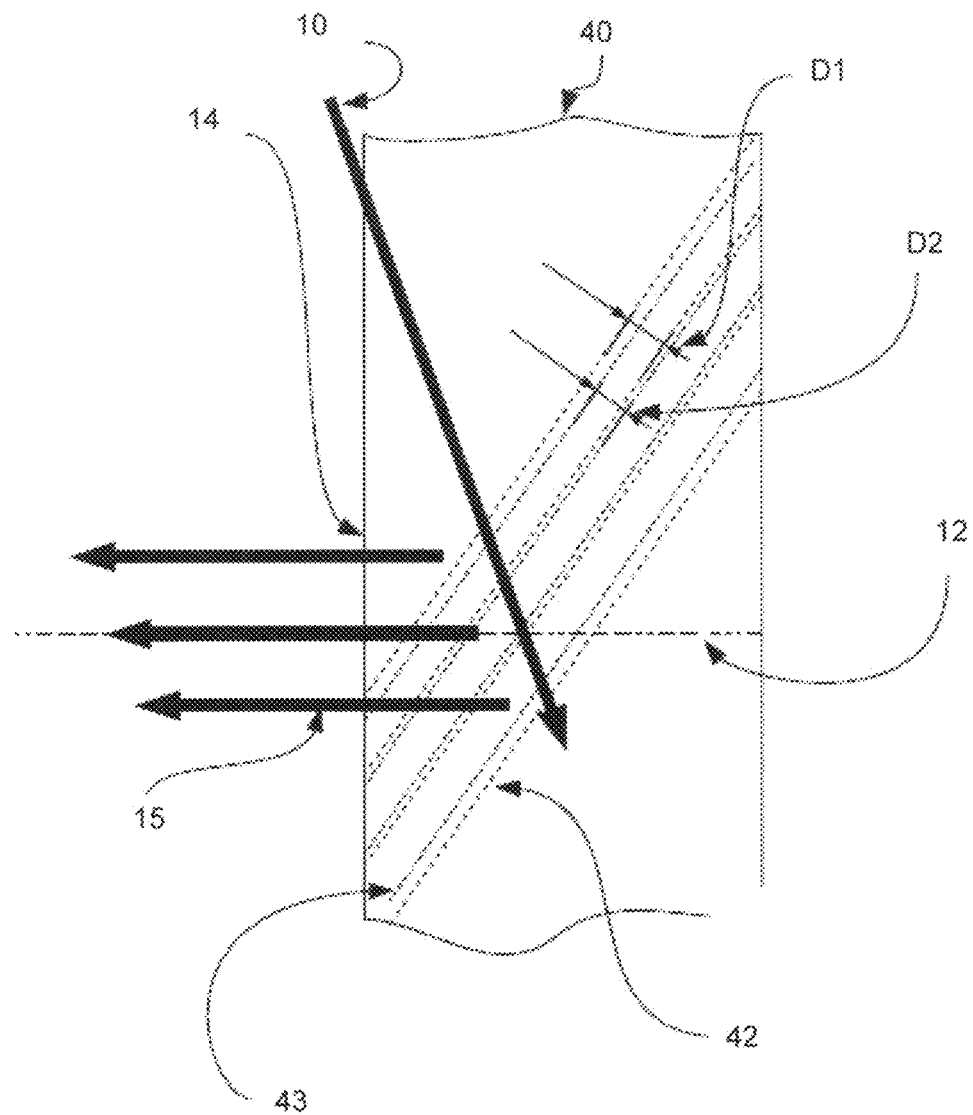
FIG. 4 shows a schematic illustration of a hologram in accordance with one embodiment.

FIG. 4 shows a schematic cross-sectional view of part of a holographic layer 40, as an implementation example for the hologram 35 from FIG. 3, in particular the region 33 considered. Elements corresponding to the elements that have already been discussed with reference to FIG. 1 bear the same reference signs here and will not be explained again. In particular, in the embodiment in FIG. 4, too, an illumination beam 10 is incident on the holographic layer 40 at an angle, for example 70 degrees with respect to the normal 12, and diffracted object light beams 15 are generated in response to this illumination, said object light beams bringing about the impression of a virtual object for an observer.

In this case, the holographic layer 40 contains for each image point of the virtual object at least two groups of Bragg planes as holographic structures, wherein the groups are parallel to one another, but the distances between the Bragg planes are different between the groups. As a result, each group of Bragg planes is designed for a different wavelength, wherein as a result of the parallel course of the groups among one another the diffraction properties for the different wavelengths are identical in each case. A first group of Bragg planes 42 having a distance D1 and a second group of Bragg planes 43 having a distance D2 are illustrated in the example in FIG. 4. As already explained for FIG. 1, in FIG. 4, too, a plurality of further corresponding groups of Bragg planes running in other directions can be provided in order to obtain a corresponding emission characteristic of the object light beams corresponding to the object stored in the holographic layer 40.

In other words, the same object for the same direction of the illumination light beam 10 is written into the holographic layer repeatedly for different wavelengths. In this way, the plurality of wavelengths are diffracted by the holographic layer 40 in an identical way. In this case, the plurality of groups of Bragg planes shown in FIG. 4 are present at each point of the hologram and for each image point to be represented, such that overall the hologram has a plurality of superimposed structures for the reconstruction of a virtual object with identical diffraction properties, wherein each of the plurality of superimposed structures is designed for a different wavelength.

In this case, the holographic layer 40 is preferably relatively thick, for example thicker than 50 μm or thicker than 140 μm, in order to achieve correspondingly sharp diffraction characteristics, as already explained with reference to FIG. 2.

In this case, the wavelengths associated with the different groups can be relatively close together, but can also be further away from one another. They preferably lie in a range which corresponds approximately to the width of a spectrum of a light source used or goes somewhat beyond that. This will now be explained on the basis of various embodiments with reference to FIG. 5.

FIG. 5 shows, in a manner similar to FIG. 2, the diffraction efficiency n in percent for a case in which the object was written into the holographic layer for five different wavelengths. The number of five wavelengths should be understood here merely as an example. In other words, in such a case, there are five groups of Bragg planes for each direction of Bragg planes (that is to say for a respective image point), wherein the groups are parallel among one another, but have different distances between the Bragg planes between the groups according to the different wavelengths.

Figure 2A:
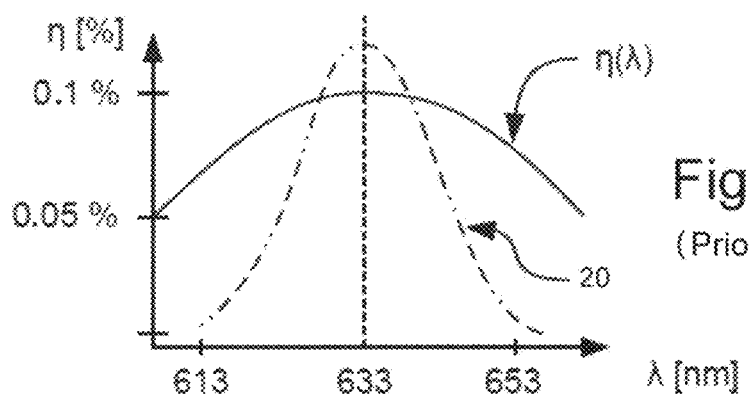
FIGS. 2A to 2C show graphs for elucidating the diffraction efficiency of holograms of various thicknesses.
Figure 2B:
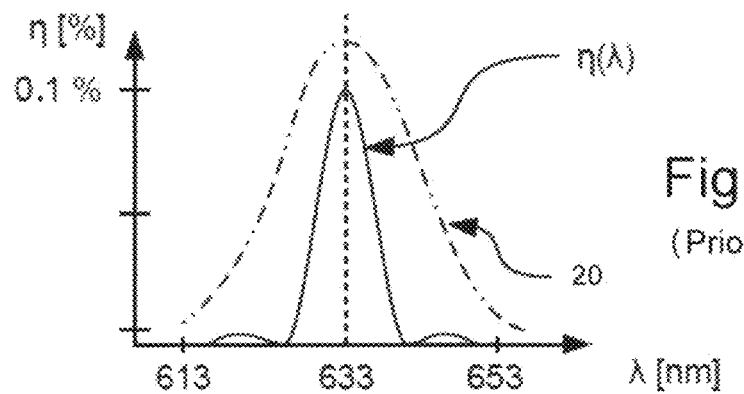
Figure 2C:
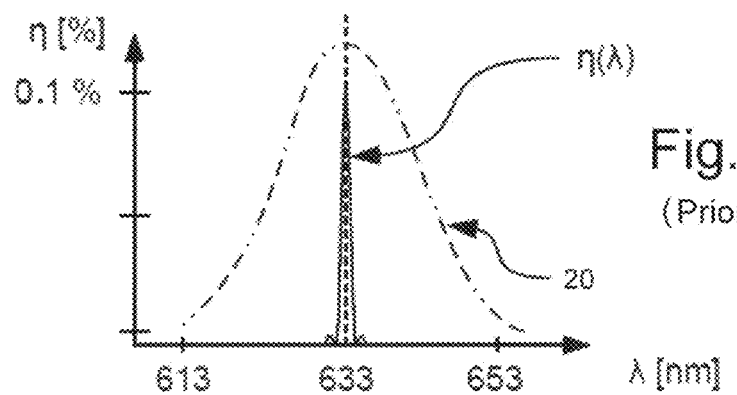
Figure 5A:
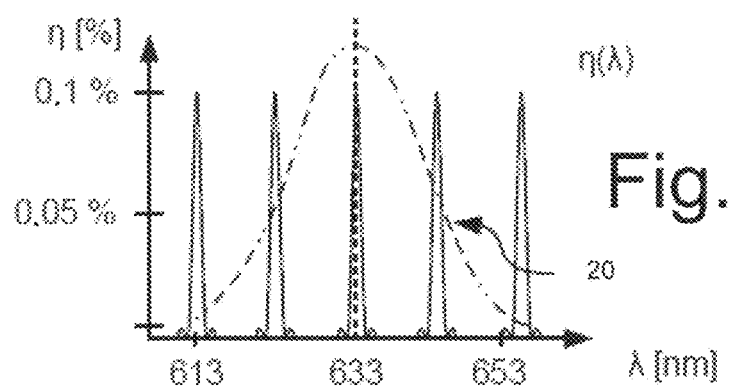
FIGS. 5A to 5C show graphs for elucidating the diffraction efficiency of holograms of various embodiments.
Figure 5B:
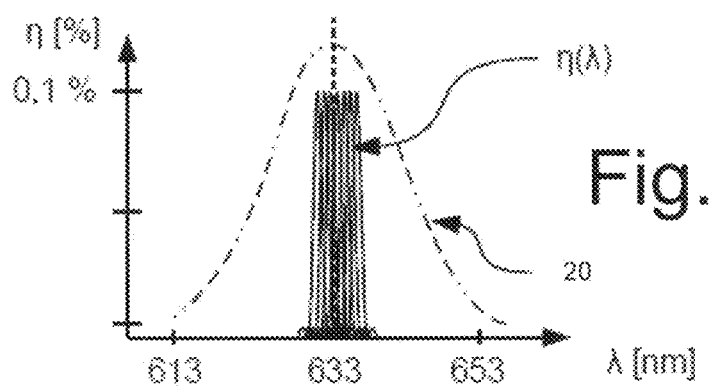
Figure 5C:
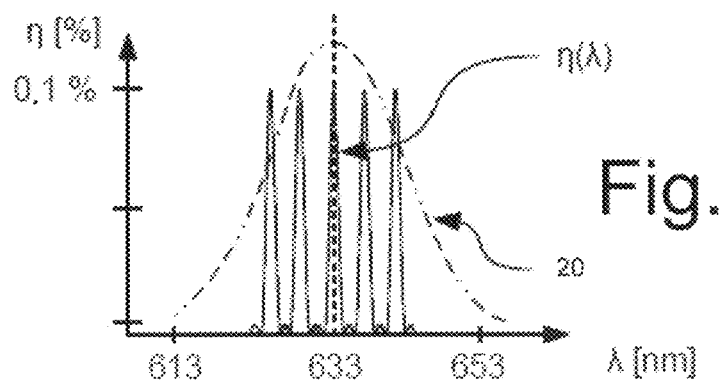

In addition, FIGS. 5A to 5C schematically show the spectrum 20 of a light emitting diode, as already explained with reference to FIGS. 2A to 2C.

In all cases in FIGS. 5A to 5C, the hologram thickness was 250 μm, resulting in correspondingly sharp, or narrow, peaks of the diffraction efficiency n.

In the embodiment in FIG. 5A, the individual peaks are spaced relatively far apart from one another and distributed equidistantly between approximately 610 nm and 655 nm. The "outer" peaks therefore lie at places where the spectrum 20 of the light emitting diode has only a low intensity.

As long as the spectrum of the light emitting diode is as represented by the curve 20, principally the central peak, the peak to the left of the central peak and the peak to the right of the central peak make the main contribution to the diffracted light. Since the peaks are very sharp, hardly any widening of fine structures of the resulting virtual object occurs. On the other hand, by virtue of the further groups of Bragg planes, the use of the spectrum of the light emitting diode is thus improved overall compared with the case in FIG. 2C.

In addition, a drift, e.g. thermal drift, of the light source arrangement can be compensated for by the arrangement in FIG. 5A. Thermal drift or other fluctuations can cause the spectrum 20 to shift toward higher or lower wavelengths. In this case, one of the two outer peaks in FIG. 5A then makes a greater contribution (the one in whose direction the spectrum shifts), while other peaks make a smaller contribution. A decrease in the intensity of the resulting luminous signature on account of thermal drift can be prevented or at least reduced in this way.

For this purpose, generally the wavelengths of the different groups can be distributed over a greater range, in particular greater than the full width at half maximum of the spectrum of the light source used.

In the embodiment in FIG. 5B, the peaks are close together and even overlap. In this way, a central portion of the spectrum of the light emitting diode 20, i.e. that portion with the greatest intensity, can be utilized well.

In the example in FIG. 5C, the peaks are distributed approximately over the full width at half maximum of the spectrum 20. Here a central range of the spectrum is still utilized well, and a drift of the spectrum is also at least approximately compensated for to a certain extent.

It should be noted that combinations of the possibilities illustrated in FIGS. 5A to 5C are also possible. By way of example, a plurality of overlapping peaks can be arranged in a central range of the spectrum of the respective light source arrangement, in a manner corresponding to Bragg planes having plane distances that differ from one another only slightly, and further peaks can be arranged further away from a center of the spectrum.

In this way, in various embodiments, it is possible to achieve an improved utilization of the spectrum of a light source arrangement such as a light emitting diode or light emitting diode arrangement with at the same time high angle selectivity and thus little widening of fine structures of a virtual object to be represented.

The above embodiments serve merely for elucidation and should not be interpreted as restrictive.

The invention claimed is:

1. A hologram for an illumination device for vehicles, comprising a plurality of superimposed holographic structures, wherein each of the plurality of holographic structures for a respectively associated reconstruction wavelength has identical diffraction directions for the reconstruction of an extensive holographic object, wherein the associated reconstruction wavelengths are different, wherein a thickness of an active layer of the hologram is greater than 50 μm.

2. The hologram as claimed in claim 1, wherein each of the plurality of superimposed holographic structures for an image point of the holographic object locally has an associated group of Bragg planes, wherein the Bragg planes of different groups which are associated with the image point are locally parallel to one another and have distances corresponding to the respectively associated reconstruction wavelengths within each group.

3. The hologram as claimed in claim 1, wherein the thickness is greater than or equal to 140 μm.

4. The hologram as claimed in claim 1, wherein the plurality of superimposed holographic structures comprises more than three holographic structures.

5. The hologram as claimed in claim 4, wherein the plurality of superimposed holographic structures comprises more than five holographic structures.

6. A hologram for an illumination device for vehicles, comprising a plurality of superimposed holographic structures, wherein each of the plurality of holographic structures for a respectively associated reconstruction wavelength has identical diffraction directions for the reconstruction of an extensive holographic object, wherein the associated reconstruction wavelengths are different, wherein values of full width at half maximum for diffraction efficiencies associated with the wavelengths overlap at least for some of the wavelengths.

7. The hologram as claimed in claim 6, wherein each of the plurality of superimposed holographic structures for an image point of the holographic object locally has an associated group of Bragg planes, wherein the Bragg planes of different groups which are associated with the image point are locally parallel to one another and have distances corresponding to the respectively associated reconstruction wavelengths within each group.

8. A hologram for an illumination device for vehicles, comprising a plurality of superimposed holographic structures, wherein each of the plurality of holographic structures for a respectively associated reconstruction wavelength has identical diffraction directions for the reconstruction of an extensive holographic object, wherein the associated reconstruction wavelengths are different, wherein at least three of the reconstruction wavelengths lie in a wavelength interval of 50 nm.

9. The hologram as claimed in claim 8, wherein the at least three of the reconstruction wavelengths lie in a wavelength interval of 25 nm.

10. The hologram as claimed in claim 8, wherein each of the plurality of superimposed holographic structures for an image point of the holographic object locally has an associated group of Bragg planes, wherein the Bragg planes of different groups which are associated with the image point are locally parallel to one another and have distances corresponding to the respectively associated reconstruction wavelengths within each group.

11. An illumination device for motor vehicles, comprising:
- a light source arrangement for generating an illumination light beam, and
- a hologram comprising a plurality of superimposed holographic structures, wherein each of the plurality of holographic structures for a respectively associated reconstruction wavelength has identical diffraction directions for the reconstruction of an extensive holographic object, wherein the associated reconstruction wavelengths are different, claim, and
- an optical arrangement for directing the illumination light beam onto the hologram, wherein the associated wavelengths are distributed over a spectral range which is greater than a full width at half maximum of a spectrum of the light source arrangement-.

12. The illumination device as claimed claim 11, wherein each of the plurality of superimposed holographic structures for an image point of the holographic object locally has an associated group of Bragg planes, wherein the Bragg planes of different groups which are associated with the image point are locally parallel to one another and have distances corresponding to the respectively associated reconstruction wavelengths within each group.

13. The illumination device as claimed claim 11, wherein a thickness of an active layer of the hologram is greater than 50 µm.

14. The illumination device as claimed claim 13, wherein the thickness is greater than or equal to 140 µm.

15. The illumination device as claimed claim 11, wherein the plurality of superimposed holographic structures comprises more than three holographic structures.

16. The illumination device as claimed in claim 15, wherein the plurality of superimposed holographic structures comprises more than five holographic structures.

17. An illumination device for motor vehicles, comprising:
- a light source arrangement for generating an illumination light beam, and
- a hologram comprising a plurality of superimposed holographic structures, wherein each of the plurality of holographic structures for a respectively associated reconstruction wavelength has identical diffraction directions for the reconstruction of an extensive holographic object, wherein the associated reconstruction wavelengths are different, claim, and
- an optical arrangement for directing the illumination light beam onto the hologram, wherein values of full width at half maximum for diffraction efficiencies associated with the wavelengths overlap at least for some of the wavelengths.

18. The illumination device as claimed claim 17, wherein each of the plurality of superimposed holographic structures for an image point of the holographic object locally has an associated group of Bragg planes, wherein the Bragg planes of different groups which are associated with the image point are locally parallel to one another and have distances corresponding to the respectively associated reconstruction wavelengths within each group.

19. An illumination device for motor vehicles, comprising:
- a light source arrangement for generating an illumination light beam, and
- a hologram comprising a plurality of superimposed holographic structures, wherein each of the plurality of holographic structures for a respectively associated reconstruction wavelength has identical diffraction directions for the reconstruction of an extensive holographic object, wherein the associated reconstruction wavelengths are different, claim, and
- an optical arrangement for directing the illumination light beam onto the hologram wherein at least three of the reconstruction wavelengths lie in a wavelength interval of 50 nm.

20. The illumination device as claimed claim 19, wherein the at least three of the reconstruction wavelengths lie in a wavelength interval of 25 nm.

21. The illumination device as claimed claim 19, wherein each of the plurality of superimposed holographic structures for an image point of the holographic object locally has an associated group of Bragg planes, wherein the Bragg planes of different groups which are associated with the image point are locally parallel to one another and have distances corresponding to the respectively associated reconstruction wavelengths within each group.

* * * * *

UNITED STATES PATENT AND TRADEMARK OFFICE
CERTIFICATE OF CORRECTION

PATENT NO. : 11,841,683 B2
APPLICATION NO. : 17/260051
DATED : December 12, 2023
INVENTOR(S) : Daniel Thomae It is certified that error appears in the above-identified patent and that said Letters Patent is hereby corrected as shown below:

In the Specification

1) Column 2, Line 47 -- "wavelength A," should be "wavelength λ"

2) Column 3, Line 45 -- the formula "n'· sin(a')=n · sin(ain)+m · λ/p" should read "n'· sin(α')=n · sin(αin)+m · λ/p"

3) Column 3, Line 48 -- "ain is the angle of incidence, a' is the emergent" should be "αin is the angle of incidence, α' is the emergent"

4) Column 3, Line 60 -- the letter "L" in the denominator of the following formula should not be present, and the formula should correctly read as follows:

"$$p = \frac{m \cdot \lambda}{n \cdot (-\sin(\alpha_{in}) - \sin \alpha')} = 449.083 \, nm$$"

In the Claims

5) Column 12, Claim 19 at Line 33 -- "onto the hologram wherein at least three" should read "onto the hologram, wherein at least three"

Signed and Sealed this
Twenty-third Day of April, 2024

*Katherine Kelly Vidal*

Katherine Kelly Vidal
*Director of the United States Patent and Trademark Office*